(12) United States Patent
Rainer et al.

(10) Patent No.: US 7,372,227 B2
(45) Date of Patent: May 13, 2008

(54) APPARATUS FOR BRAKING A SYNCHRONOUS MACHINE

(75) Inventors: Josef Rainer, Franking (AT); Erwin Bernecker, Hochburg (AT)

(73) Assignee: Bernecker + Rainer Industrie-Elektronik Gesellschaft m.b.H., Eggelsberg (AT)

( * ) Notice: Subject to any disclaimer, the term of this patent is extended or adjusted under 35 U.S.C. 154(b) by 0 days.

(21) Appl. No.: 10/578,969

(22) PCT Filed: Nov. 12, 2004

(86) PCT No.: PCT/AT2004/000401

§ 371 (c)(1),
(2), (4) Date: May 11, 2006

(87) PCT Pub. No.: WO2005/048446

PCT Pub. Date: May 26, 2005

(65) Prior Publication Data

US 2007/0090783 A1    Apr. 26, 2007

(30) Foreign Application Priority Data

Nov. 14, 2003 (AT) .............................. A 1834/2003

(51) Int. Cl.
H02P 3/22  (2006.01)
(52) U.S. Cl. .................. 318/375; 318/380; 318/811
(58) Field of Classification Search ............ 318/379, 318/380, 700, 720, 434
See application file for complete search history.

(56) References Cited

U.S. PATENT DOCUMENTS

| | | | | |
|---|---|---|---|---|
| 3,656,039 A * | 4/1972 | Konrad | ...................... | 318/138 |
| 4,754,211 A * | 6/1988 | Karjalainen | .................. | 318/762 |
| 5,546,014 A * | 8/1996 | Haussecker | .................. | 324/772 |
| 5,847,533 A * | 12/1998 | Hakala et al. | .............. | 318/798 |
| 5,892,342 A * | 4/1999 | Friedlander et al. | ........ | 318/434 |
| 6,078,156 A * | 6/2000 | Spurr | .......................... | 318/368 |
| 6,194,856 B1 * | 2/2001 | Kobayashi et al. | ......... | 318/432 |
| 6,741,482 B2 * | 5/2004 | Yamamoto et al. | ........... | 363/37 |
| 6,836,085 B2 * | 12/2004 | Kawada et al. | ............. | 318/139 |
| 7,019,479 B2 * | 3/2006 | Tobias et al. | ............... | 318/439 |
| 7,075,257 B2 * | 7/2006 | Carrier et al. | .............. | 318/375 |

FOREIGN PATENT DOCUMENTS

| | | |
|---|---|---|
| DE | 3710842 A1 * | 10/1988 |
| DE | 102 06 828 A1 | 8/2003 |

(Continued)

OTHER PUBLICATIONS

International Search Report, (Apr. 2005).

*Primary Examiner*—Lincoln Donovan
*Assistant Examiner*—Eduardo Colon
(74) *Attorney, Agent, or Firm*—Collard & Roe, PC

(57) ABSTRACT

A method is proposed for braking a synchronous machine 1, with the armature windings (u, v, w) of the synchronous machine 1 being short-circuited, optionally by interposing at least one braking resistor. In order to keep the braking moment constant over virtually the entire speed range it is proposed that the short-circuit current is regulated by a pulse-width modulation depending on the difference between the setpoint value of the short-circuit current corresponding to the setpoint value of the braking moment and the actual value of the short-circuit current.

2 Claims, 4 Drawing Sheets

FOREIGN PATENT DOCUMENTS

| | | |
|---|---|---|
| EP | 0 648 008 A | 4/1995 |
| EP | 1 162 726 A | 12/2001 |
| JP | 55111683 A * | 8/1980 |
| JP | 56133992 A * | 10/1981 |
| JP | 04 255497 A | 9/1992 |
| JP | 09 047055 A | 2/1997 |
| JP | 2000037002 A * | 2/2000 |

* cited by examiner

APPARATUS FOR BRAKING A SYNCHRONOUS MACHINE

CROSS REFERENCE TO RELATED APPLICATIONS

Applicants claim priority under 35 U.S.C. §119 of Austrian Application No. A 1834/2003 filed Nov. 14, 2003. Applicants also claim priority under 35 U.S.C. §365 of PCT/AT/2004/000401 filed Nov. 12, 2004. The international application under PCT article 21(2) was not published in English.

FIELD OF THE INVENTION

The invention relates to a method for braking a synchronous machine, with the armature windings of the synchronous machine being short-circuited, optionally by interposing at least one braking resistor.

DESCRIPTION OF THE PRIOR ART

A synchronous machine is further proposed for performing the method with a permanent-field rotor for example and with a shortable armature winding which is connected to a power converter which comprises a half bridge each for positive and negative half-waves of the current, which half bridge can be switched via a power breaker.

In the case of overload, mains voltage failure, intermediate circuit surge, loss of positional or speed information it may be necessary for synchronous machines to initiate an immediate emergency stop. This emergency stop can occur either by severing the power from the mains to the armature windings or by active braking. An especially simple possibility for active braking of synchronous motors is short-circuit braking, in which the terminals of the armature winding are shorted via a power breaker, optionally by interposing braking resistors. The braking moment characteristic to be achieved via the speed corresponds in this case approximately to the torque characteristic of an asynchronous machine. When the braking of a synchronous machine is to be initiated, the power inverter needs to be deactivated first in order to prevent a short-circuit of the intermediate circuit, whereupon the power breaker will short-circuit the armature windings, optionally by interposing breaking resistors. If no additional braking resistors are provided in the shorted circuit, the braking moment varies especially strongly during the braking process via the speed. The braking moment which at the beginning of the braking is relatively low rises relatively late to its maximum value in order to drop thereafter steeply to zero. The disadvantage lies thus in the comparatively small initial braking moment and in the braking moment which is not constant over the entire speed range. When the initial value of the braking moment is to be increased, an additional braking resistor needs to be provided in the shorted circuit, as a result of which the braking moment is displaced similar to the moment characteristic of the asynchronous motor and the evenness of the braking moment can be improved. A relevant disadvantage in using braking resistors is that additional components need to be provided which are also subject to strong thermal strains, which depending on the dimensioning of the braking resistors does not always allow to re-initiate a renewed short-circuit braking immediately after a performed short-circuit braking. It is thus necessary to wait a predetermined period of time between two short-circuit braking actions until the braking resistors have cooled again. A further relevant disadvantage of the short-circuit braking is that the short-circuit current can reach high peak values, which may lead to permanent damage to the motor when a maximum permitted current is exceed, especially a demagnetization of permanent magnets of a permanent-field synchronous machine.

SUMMARY OF THE INVENTION

The invention is thus based on the object of providing a method for braking a synchronous machine of the kind mentioned above, with which the short-circuit current is limited in a secure manner and the braking moment to be achieved can be regulated to a virtually constant value over the entire speed band, if possible. Moreover, a synchronous machine shall be provided for performing the method, which machine comprises the simplest possible braking device.

The invention achieves this object in such a way that the short-circuit current is regulated by a pulse-width modulation depending on the difference between the setpoint value of the short-circuit current corresponding to the setpoint value of the braking moment and the actual value of the short-circuit current.

In accordance with the invention, the short-circuit current in the armature windings is regulated in a pulse-width-controlled manner. This is achieved in such a way for example that power breakers short the armature windings depending on the short-circuit duration by the closed-loop control. The short-circuit current can be predetermined with the help of pulse-width modulation in such a way that the desired braking moment is obtained in an especially simple way. This allows not only keeping the braking moment virtually constant over the entire speed range, but also offers the possibility to brake in an especially simple way with every torque smaller than the maximum one, because it may occur in a number of applications that damage will occur in the mechanism coupled via the motor shaft of the synchronous machine by too strong braking. Any excessively strong rise of the short-circuit current can also be remedied elegantly with the closed-loop control in accordance with the invention, which thus securely prevents any exceeding of the permissible short-circuit current and thus a demagnetization of permanent magnets. A further advantage of the closed-loop control in accordance with the invention is that after an occurred short-circuit braking, a short-circuit braking can be initiated directly thereafter and it is not necessary to wait for any cooling period, as is the case in dynamic braking in accordance with the state of the art.

A synchronous machine in accordance with the invention for performing the method with a rotor and a shortable armature winding which is connected to a power converter which comprises a half-bridge each for positive and negative half-waves of the current which can be switched via a power breaker, is characterized in accordance with the invention in such a way that the power breakers shorting the armature windings can be triggered via a control device depending on the difference between the setpoint value of the short-circuit current corresponding to the setpoint value of the braking moment and the actual value of the short-circuit current. In such a synchronous machine in accordance with the invention, the short circuit is produced in the armature windings by way of the power inverter, so that no additional power semiconductor components are necessary. For the purpose of braking the synchronous machine, the operating times for the power breakers are no longer determined by a vector control controlling the operation of the synchronous machine, but by a torque regulator which triggers the armature windings depending on the short-circuit current to be achieved.

It is especially advantageous when the power breakers of two half-bridges of the converter which short the armature windings can be triggered in an alternating fashion by way of a closed-loop control device depending on the difference between the setpoint value of the short-circuit current corresponding to the setpoint value of the braking moment and the actual value of the short-circuit current. As a result, both the half-bridge for positive half-waves and the half-bridge for negative half-waves of the power converter can be used as short-circuit elements, thus ensuring an improved thermal loading of the power breakers. The braking output is carried off according to this embodiment of the invention thus in an especially simple way via the power converter which can generally be highly loaded in a thermal respect, the armature windings and an optionally provided braking resistor. As a result, the constructional complexity is minimized and only very few additional measures need to be provided for the braking operation of a synchronous machine in accordance with the invention.

As an alternative to the above embodiment of a synchronous machine, a synchronous machine with a rotor and an armature winding, which can optionally be shorted via a braking resistor according to a further advantageous embodiment of the invention, can be characterized in that the armature windings are connected to a rectifier circuit which can be shorted by way of a power breaker and that the power breaker can be triggered via a closed-loop control device depending on the difference between the setpoint value of the short-circuit current corresponding to the setpoint value of the braking moment and the actual value of the short-circuit current. According to this embodiment of a synchronous machine in accordance with the invention, the short circuit for the armature windings is produced by way of a separate power semiconductor circuit. The short-circuit current of the armature windings is rectified in the rectifier circuit and the outputs for positive and negative half-waves are then shorted via a power breaker and optionally a braking resistor. A relevant advantage of this synchronous machine in accordance with the invention is that the function of the braking device can be checked in an especially simple manner in a continuous or intermittent way. This is especially advantageous when high requirements are placed on the continuous availability of the braking device. A control unit which is separately provided can ensure a short-circuit in the rectifier circuit at short notice even during the operation of the synchronous machine and a separately provided monitoring device can ensure the proper function of the braking device, e.g. by way of a current measurement in the shorted circuit. As was already mentioned, this functional test can also occur in operation of the power inverter, as a result of which all components and functions of the braking device can be checked continually. As a result of providing two channels between the braking device and the power converter and of the continual checking capability of the braking device, an especially high safety class can be achieved.

BRIEF DESCRIPTION OF THE DRAWINGS

The invention is explained schematically in closer detail by reference to an embodiment shown in the drawings, wherein.

DESCRIPTION OF THE PREFERRED EMBODIMENTS

Figure 1:
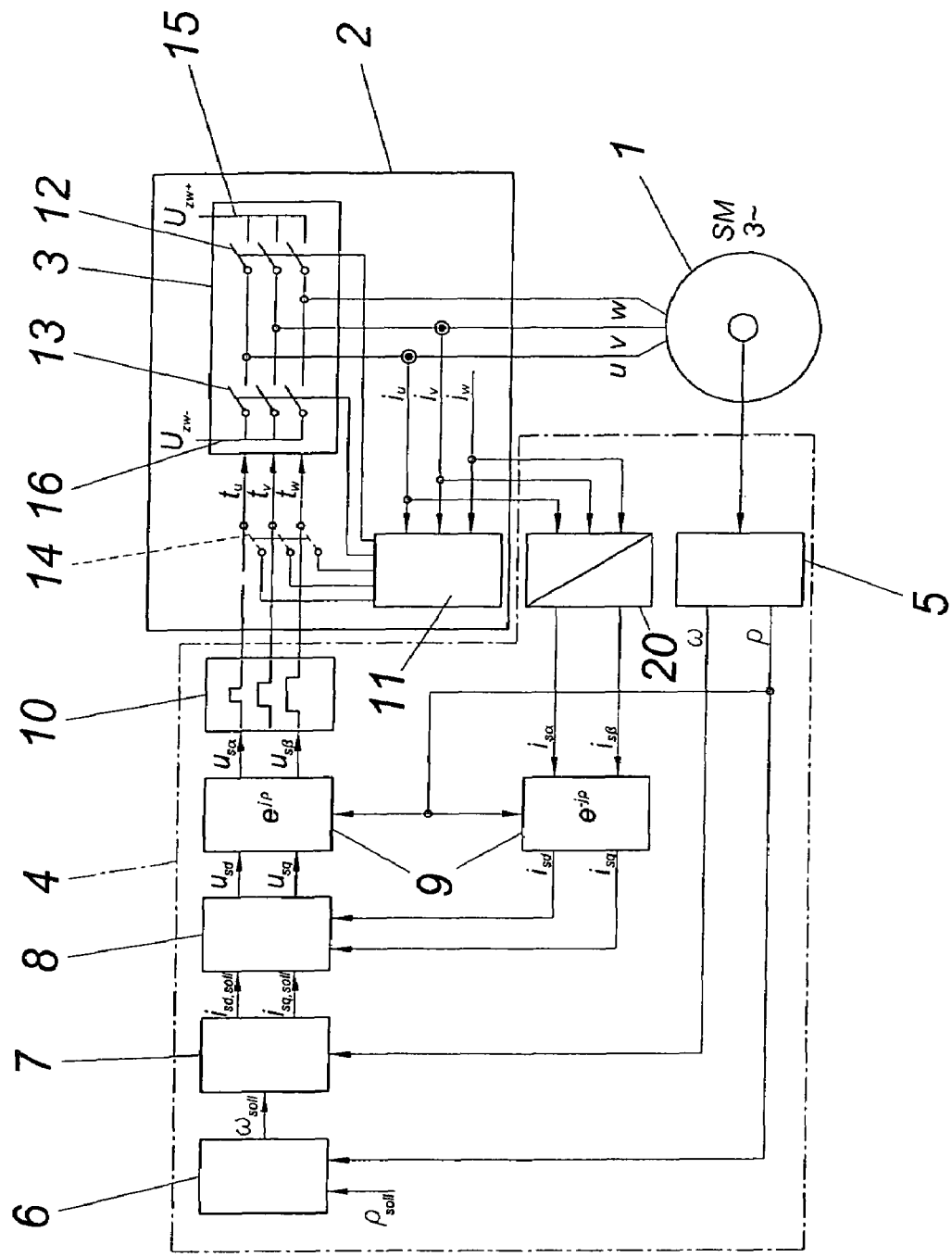
FIGS. 1 and 2 each show an embodiment of a synchronous machine in accordance with the invention.

A permanent-field synchronous machine 1 comprises armature windings u, v, w which can be shorted via a braking device 2. A power converter 3 is provided for the normal operation of the synchronous machine 1, which converter is triggered by way of a triggering unit 4 in the usual manner.

The triggering unit 4 comprises, among other things, a rotational angle and rotational speed transducer 5, a positional controller 6, a speed controller 7, a current controller 8 and converters for mathematical transformations 9, a space vector modulation 10 and a two of three converter 20.

According to the embodiment according to FIG. 1, the braking device 2 comprises a torque controller 11 which shorts the power breaker elements 12 and 13 in a preferably alternating manner in the case of a braking. Prior to this, it is necessary to prevent a triggering of the power breakers 12 and 13 by the triggering unit 4, for which purpose the switches 14 are opened in this case. For the purpose of braking the synchronous machine 1, the power breakers 12, 13 of at least one half-bridge 15, 16 of the power converter 3, which power breakers short armature windings u, v, w, are triggered in an alternating manner via the controller 11 depending on the difference between the setpoint value of the short-circuit current corresponding to the setpoint value of the braking moment and the actual value of the short-circuit current.

Figure 2:
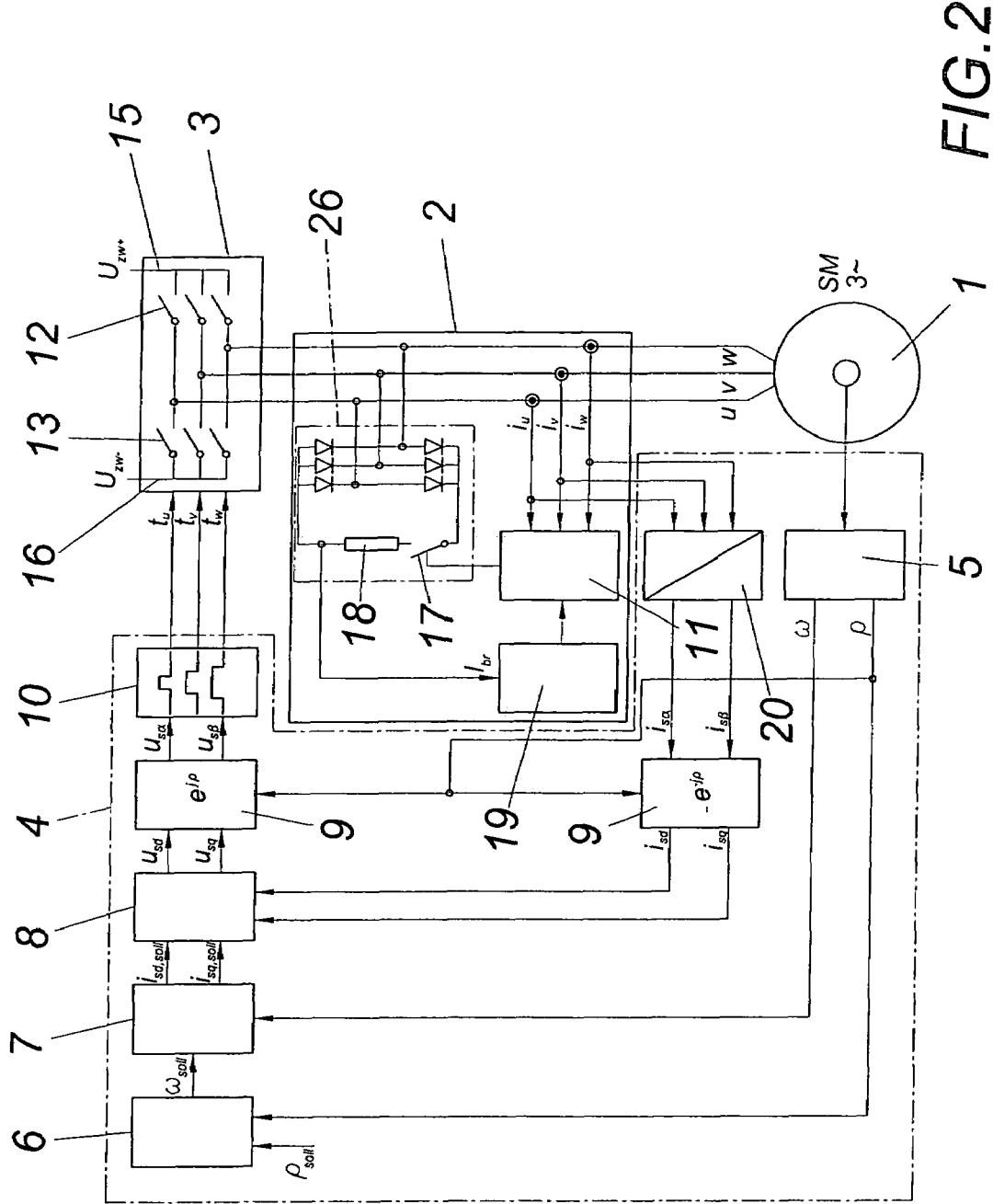

According to the embodiment according to FIG. 2, the braking device comprises a rectifier circuit 26 which is connected to the armature windings u, v, w. For the purpose of braking the synchronous machine 1, the rectifier circuit 26 which is connected to the armature windings u, v, w can be shorted via a power breaker 17 and a braking resistor 18, with the power breaker 17 being triggerable via the controller 11 depending on the difference between the setpoint value of the short-circuit current corresponding to the setpoint value of the braking moment and the actual value of the short-circuit current. In order to enable verifying the proper function of the braking device 2 at all times, a control device 19 is provided with which the function of the braking device can also be checked during the operation of the inverter, such that the same shorts the power breaker 17 by way of the controller 11 for a predetermined period and measures short-circuit current flowing in the shorted circuit.

Figure 3:
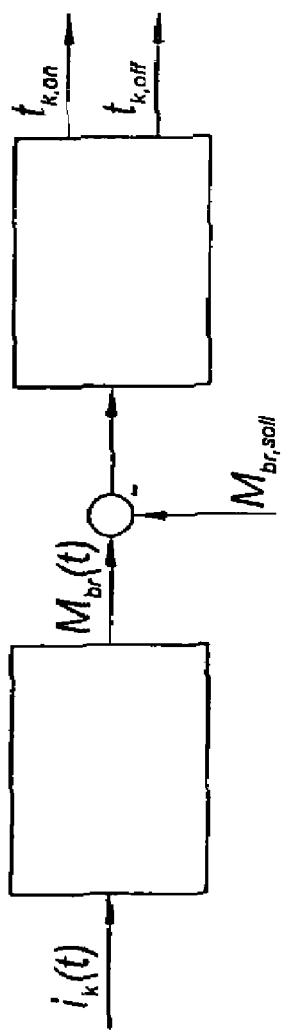
FIGS. 3 and 4 show two control concepts for short-circuit braking.
Figure 4:
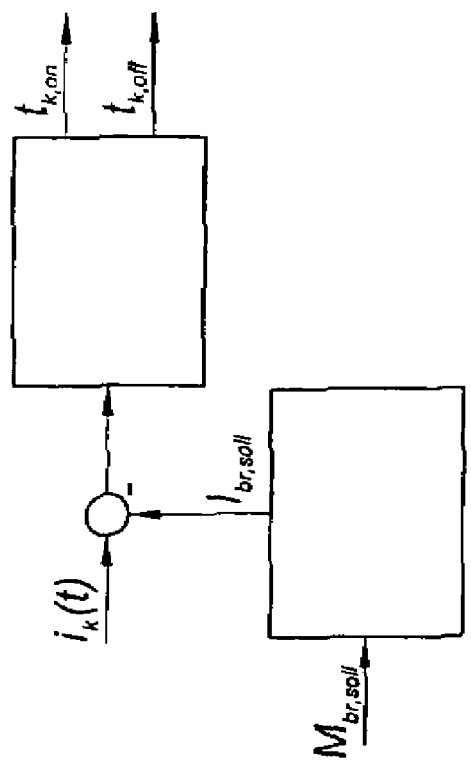

FIGS. 3 and 4 show control concepts for short-circuit braking. The short-circuit current $i_k$ of the armature windings u, v, w and the setpoint braking moment $M_{br,\,soll}$ are always used as the input variable for the closed-loop control and the control device supplies at the output switching periods $T_{k,on}$ (switch on) and $T_{k,off}$ (switch off) for the power breakers 12, 13, 17.

Figure 5:
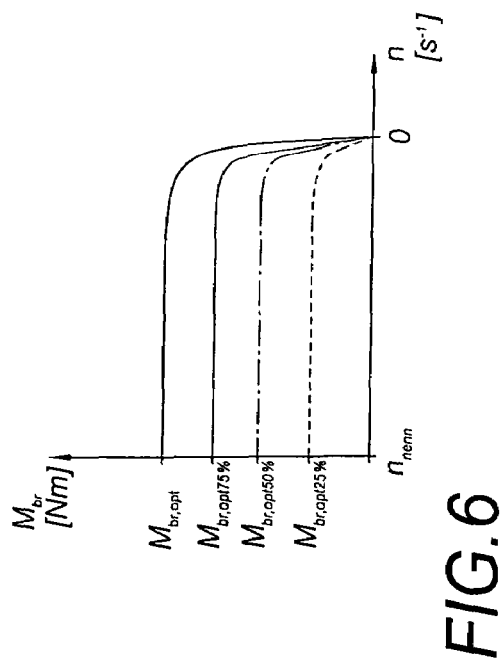
FIGS. 5 and 7 show diagrams concerning the torque or speed characteristic of a short-circuit braking according to the state of the art.
Figure 6:
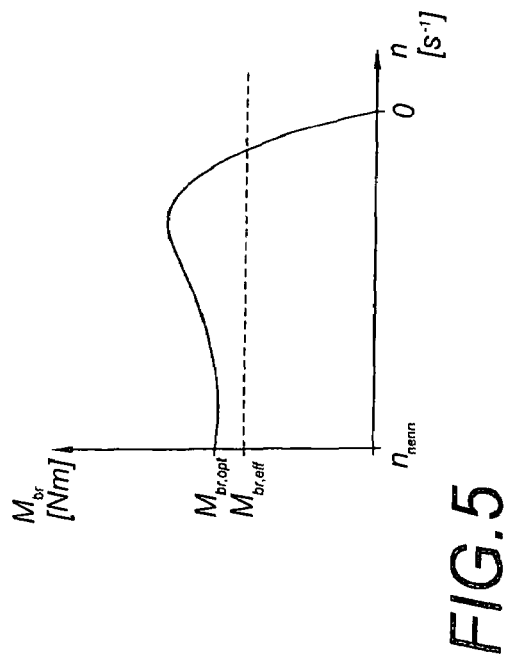
FIGS. 6 and 8 show diagrams concerning the torques and the speed characteristic of a short-circuit breaking according to the invention.
Figure 7:
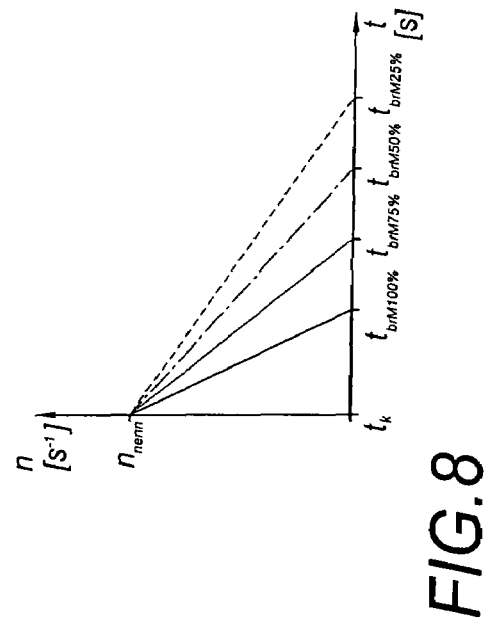
Figure 8:
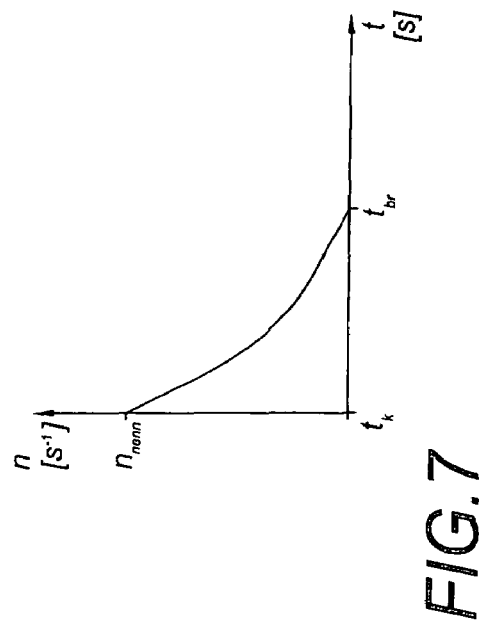

FIGS. 5 and 6 show the braking moment characteristic over the speed during a short-circuit braking with a braking resistor according to the state of the art (FIG. 5) and with a braking apparatus in accordance with the invention (FIG. 6). FIGS. 7 and 8 show the speed characteristics over time relating to FIGS. 5 and 6.

The invention claimed is:

1. An apparatus for braking a synchronous machine comprising a rotor and shortable armature windings, the apparatus comprising a power converter connected to the armature windings and comprising a half-bridge for positive half-waves of the current and a half-bridge for negative half-waves of the current, the half-bridges being switchable by power breakers which short the armature windings, and the power breakers of the half-bridges being controllable alternatingly by a control device regulating the short-circuit current by a pulse-width modulation depending on the difference between a set value of the braking moment and an actual value of the short-circuit current.

2. An apparatus for braking a synchronous machine comprising a rotor and short-circuited armature windings, the apparatus comprising a rectifier circuit connected to the armature windings and shorted by a power breaker, and the power breaker being triggered via a closed-loop control device regulating the short-circuit current by a pulse-width modulation depending on the difference between a set value of the short-circuit current corresponding to a set value of the braking moment and the actual value of the short-circuit current.

* * * * *